US012559107B2

(12) United States Patent
Basso

(10) Patent No.: US 12,559,107 B2
(45) Date of Patent: Feb. 24, 2026

(54) RANGE PREDICTION FOR VEHICLES

(71) Applicant: VOLVO TRUCK CORPORATION, Gothenburg (SE)

(72) Inventor: Rafael Basso, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 47 days.

(21) Appl. No.: 18/441,273

(22) Filed: Feb. 14, 2024

(65) Prior Publication Data

US 2024/0294169 A1 Sep. 5, 2024

(30) Foreign Application Priority Data

Mar. 1, 2023 (EP) ..................................... 23159444

(51) Int. Cl.
| | |
|---|---|
| *B60W 30/182* | (2020.01) |
| *B60L 58/13* | (2019.01) |
| *G01C 21/34* | (2006.01) |
| *G01C 21/36* | (2006.01) |

(52) U.S. Cl.
CPC ........... *B60W 30/182* (2013.01); *B60L 58/13* (2019.02); *G01C 21/3469* (2013.01);
(Continued)

(58) Field of Classification Search
CPC ......... B60W 30/182; B60W 2510/244; B60W 2555/20; B60L 58/13; B60L 2240/66;
(Continued)

(56) References Cited

U.S. PATENT DOCUMENTS

| | | |
|---|---|---|
| 2013/0041552 A1 | 2/2013 | Macneille et al. |
| 2019/0016329 A1 | 1/2019 | Park et al. |

(Continued)

OTHER PUBLICATIONS

Extended European Search Report in corresponding European Application No. 23159444.1 dated Sep. 11, 2023 (10 pages).

(Continued)

*Primary Examiner* — Long T Tran
*Assistant Examiner* — Charles J Brauch
(74) *Attorney, Agent, or Firm* — Jeffri A. Kaminski; Venable LLP

(57) ABSTRACT

A computer system is configured to receive a start position and a planned destination position for an electric vehicle of a vehicle type, estimate energy consumption and variance for at least one route between the start position and the destination position for the vehicle type, based on reference energy consumption vehicle data collected from secondary vehicles, calculate a confidence interval for the estimated energy consumption and variance at a predetermined confidence level, determine a present energy level in the electrical energy storage system, in response to the present energy level being below the confidence interval upper limit, control the vehicle according to a first mode, the first mode including a first route between the start position and the destination position, and in response to the present energy level exceeding or being equal to the confidence interval upper limit, control the vehicle according to a second mode, the second mode including a second route between the start position and the destination position.

14 Claims, 7 Drawing Sheets

(52) U.S. Cl.
CPC ...... *G01C 21/3691* (2013.01); *B60L 2240/66* (2013.01); *B60L 2260/54* (2013.01); *B60W 2510/244* (2013.01); *B60W 2555/20* (2020.02)

(58) Field of Classification Search
CPC ...... B60L 2260/54; B60L 50/60; B60L 58/12; B60L 2240/72; B60L 2260/26; G01C 21/3469; G01C 21/3691; G01R 31/382; G01R 31/389; G01R 31/392; G05D 1/246; G05D 1/43; G05D 1/644; G05D 1/65; G05D 2109/10
See application file for complete search history.

(56) References Cited

U.S. PATENT DOCUMENTS

| | | |
|---|---|---|
| 2019/0275887 A1 | 9/2019 | Michalakis |
| 2020/0011687 A1 | 1/2020 | Lindemann et al. |
| 2020/0166356 A1 | 5/2020 | Beaurepaire et al. |
| 2023/0228581 A1* | 7/2023 | Askerdal ............ G01C 21/3469 701/123 |

OTHER PUBLICATIONS

Rafael Basso, Balázs Kulcsár, Ivan Sanchez-Diaz, Xiaobo Qu, "Dynamic stochastic electric vehicle routing with safe reinforcement learning", Transportation Research Part E: Logistics and Transportation Review, vol. 157, 2022, 102496, ISSN 1366-5545, https://doi.org/10.1016/j.tre.2021.102496 (22 pages).

* cited by examiner

RANGE PREDICTION FOR VEHICLES

TECHNICAL FIELD

The disclosure relates generally to vehicles. In particular aspects, the disclosure relates to range prediction for vehicles. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Range of electric vehicles strongly depends on factors such as for example topography, speed, traffic conditions, weather, payload, etc. Range prediction algorithms base an estimated range prediction on past information such as the most recently travelled range and the respective power used. However, many of the factors that affect the range are highly dynamic and uncertain, such as traffic congestions and driver behavior. This may cause inaccurate range predictions.

SUMMARY

According to a first aspect of the disclosure, there is provided a computer system comprising processing circuitry configured to: receive a start position and a planned destination position for an electric vehicle of a vehicle type, the vehicle comprising an electrical energy storage system, estimate energy consumption and variance for at least one route between the start position and the destination position for the vehicle type, based on reference energy consumption vehicle data collected from secondary vehicles, calculate a confidence interval for the estimated energy consumption and variance at a predetermined confidence level, determine a present energy level in the electrical energy storage system, in response to the present energy level being below the confidence interval upper limit, control the vehicle according to a first mode, the first mode including a first route between the start position and the destination position, and in response to the present energy level exceeding or being equal to the confidence interval upper limit, control the vehicle according to a second mode, the second mode including a second route between the start position and the destination position.

The first aspect of the disclosure may seek to improve range prediction for a vehicle. A technical benefit may include better utilization of the presently available energy in the electrical energy storage and improved route planning.

In some examples, including in at least one preferred example, optionally the processing circuitry is further being configured to: determine the total time for the first route and for the second route. A technical benefit may include improved path planning since also the times for completing the first and second routes are estimated.

In some examples, including in at least one preferred example, optionally the computer system comprising a memory device that stores the reference vehicle data for a plurality of secondary vehicles that have travelled between the start position and the planned destination position, the processing circuitry being configured to: collect the reference vehicle data, and apply an algorithm for estimating the energy consumption and variance and calculate the confidence interval. A technical benefit may include improved accuracy in the estimated energy consumption and variance since the memory device may accumulate reference data.

Further, storing the reference data locally reduces latency in retrieving the data thereby speeding up the time for estimating the energy consumption and variance.

In some examples, including in at least one preferred example, optionally, the first mode comprises a speed profile for the first route and the second mode comprises a speed profile for the second route. A technical benefit may include improved path planning since also the speed profiles are estimated. Further, this may improve utilization of the energy in the electrical energy storage, thus it is easier to accurately estimate the energy consumption if a speed profile along the route is calculated.

In some examples, including in at least one preferred example, optionally, wherein the first route includes a charging event at a charging station. Thus, the processing circuitry may plan for charging stops along the route, especially if the present energy level is below the upper limit of the confidence interval which means the range may not be sufficient to reach the destination with high enough confidence.

Furthermore, in some optional examples, the first mode and the second mode may comprise indications of charging stations stops along the respective first and second routes.

In some examples, including in at least one preferred example, optionally, the processing circuitry may be configured to: estimate energy consumption and variance for remainder of the first route between the charging station and the destination position for the vehicle type, based on reference energy consumption vehicle data for the remainder of the first route collected from secondary vehicles, calculate a confidence interval for the estimated energy consumption for remainder of the first route and corresponding the variance at a predetermined confidence level, calculate the required minimum charging amount for ensuring an energy level in the electrical energy storage to fall within the confidence interval; and control the charging of the electrical energy storage according to the required minimum charging amount. A technical benefit may be that the charging itself is also planned so that the destination can be reached in minimum amount of time.

In some examples, including in at least one preferred example, optionally, the processing circuitry is configured to receive weather data indicating the present weather conditions in the area between the start position and the destination position and estimate the energy consumption and variance further based on the weather data. A technical benefit may include improved estimations of energy consumption and variance since also the weather condition are taken into consideration.

In some examples, including in at least one preferred example, optionally, the processing circuitry is configured to receive a time constraint and determine the first route and/or the second route so that the destination position is reachable within the time constraint. A technical benefit may include improved path planning. Thus, it may be desirable to reach the destination within a given time constraint which may affect the selection of route.

There is further provided a vehicle comprising the computer system.

According to a second aspect of the disclosure, there is provided a computer-implemented method comprising receiving, by processing circuitry of a computer system, start position and a planned destination position for an electric vehicle of a vehicle type, the vehicle comprising an electrical energy storage system, estimating, by the processing circuitry, energy consumption and variance for at least one route between the start position and the destination position for the vehicle type, based on reference energy consumption vehicle data collected from secondary vehicles, calculating, by the processing circuitry, a confidence interval for the estimated energy consumption and variance at a predetermined confidence level; determining, by the processing circuitry, a present energy level in the electrical energy storage system; in response to the present energy level being below the confidence interval upper limit, controlling, by the processing circuitry, the vehicle according to a first mode, the first mode including a first route between the start position and the destination position, and in response to the present energy level exceeding or being equal to the confidence interval upper limit, controlling, by the processing circuitry, the vehicle according to a second mode, the second mode including a second route between the start position and the destination position.

The second aspect of the disclosure may seek to improve range prediction for a vehicle. A technical benefit may include better utilization of the presently available energy in the electrical energy storage and improved route planning.

In some examples, including in at least one preferred example, optionally determining, by the processing circuitry, the total time for the first route and for the second route. A technical benefit may include improved path planning since also the times for completing the first and second routes are estimated.

In some examples, including in at least one preferred example, optionally determining, further comprising: maintaining, by the processing circuitry, a database of reference vehicle data for a plurality of secondary vehicles that have travelled between the start position and the destination position, and collecting, by the processing circuitry, further reference vehicle data to update the database. A technical benefit may include improving the estimated energy consumption by improving the models or algorithms with the continuously updated database.

In some examples, including in at least one preferred example, optionally comprising applying, by the processing circuitry, a machine learning algorithm for estimating the energy consumption and variance and calculate the confidence interval. A technical benefit may include efficient utilization of the collected reference data when making the estimations.

In some examples, including in at least one preferred example, optionally, comprising: training, by the processing circuitry, the machine learning algorithm with the collected data when the database is updated. A technical benefit may include to constantly improving the algorithm and thereby also the estimations.

In some examples, including in at least one preferred example, optionally comprising: receiving, by the processing circuitry, a time constraint, and determining, by the processing circuitry, the first route and/or the second route so that the destination position is reachable within the time constraint. A technical benefit may include improved path planning. Thus, it may be desirable to reach the destination within a given time constraint which may affect the selection of route.

In some examples, including in at least one preferred example, optionally comprising: receiving, by the processing circuitry, weather data indicating the present weather conditions in the area between the start position and the destination position, and estimating, by the processing circuitry, the energy consumption and variance further based on the weather data. A technical benefit may include improved estimations of energy consumption and variance since also the weather condition are taken into consideration.

In some examples, including in at least one preferred example, optionally the first mode comprises a speed profile for the first route and the second mode comprises a speed profile for the second route. A technical benefit may include improved path planning since also the speed profiles are estimated. Further, this may improve utilization of the energy in the electrical energy storage, thus it is easier to estimate the energy consumption if a speed profile along the route is calculated.

In some examples, including in at least one preferred example, optionally the first route includes a charging event at a charging station. Thus, the processing circuitry may plan for charging stops along the route, especially if the variance is below the threshold which means the range may not be sufficient with high enough confidence. Furthermore, the second route may also include charging events.

In some examples, including in at least one preferred example, optionally, the method may comprise: estimating, by the processing circuitry, energy consumption and variance for remainder of the first route between the charging station and the destination position for the vehicle type, based on reference energy consumption vehicle data for the remainder of the first route collected from secondary vehicles, calculating, by the processing circuitry, a confidence interval for the estimated energy consumption for remainder of the first route and corresponding the variance at a predetermined confidence level, calculating, by the processing circuitry, the required minimum charging amount for ensuring an energy level in the electrical energy storage to fall within the confidence interval; and controlling, by the processing circuitry, the charging of the electrical energy storage according to the required minimum charging amount. A technical benefit may be that the charging itself is also planned so that the destination can be reached in minimum amount of time.

In some examples, including in at least one preferred example, optionally comprising: determining, by the processing circuitry, the total time for the first route and for the second route, receiving, by the processing circuitry, a time constraint, determining, by the processing circuitry, the first route and/or the second route so that the destination position is reachable within the time constraint, maintaining, by the processing circuitry, a database of reference vehicle data for a plurality of secondary vehicles that have travelled between the start position and the planned destination position, collecting, by the processing circuitry, further reference vehicle data to update the database, applying, by the processing circuitry, a machine learning algorithm to the reference vehicle data for estimating the energy consumption and variance and calculate the confidence interval, receiving, by the processing circuitry, weather data indicating the present weather conditions in the area between the start position and the destination position, estimating, by the processing circuitry, the energy consumption and variance for the vehicle further based on the weather data, wherein the first route is different from the second route, and wherein the first route includes a charging event at a charging station.

There is further provided a computer program product comprising program code for performing, when executed by the processing circuitry, the method of any of the examples of the second aspect.

There is further provided a non-transitory computer-readable storage medium comprising instructions, which when executed by the processing circuitry, cause the processing circuitry to perform the method of any of the examples of the second aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

The detailed description set forth below provides information and examples of the disclosed technology with sufficient detail to enable those skilled in the art to practice the disclosure.

Figure 1:
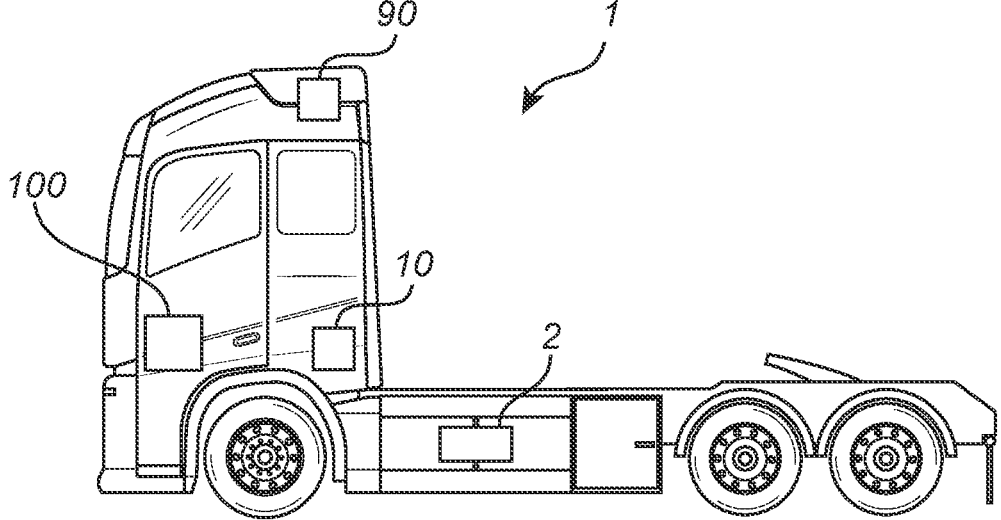
FIG. 1 is an exemplary vehicle according to an example.

FIG. 1 illustrates a vehicle in the form of an electrical truck 1 comprising a rechargeable propulsion electrical energy storage system 2 generally comprising a plurality of series and parallel connected electrical energy storage cells. The propulsion electrical energy storage 2 is arranged to provide power to an electrical engine (not shown) arranged for providing propulsion for the electrical truck 1. The electrical truck 1 further comprises an electrical energy storage managing system 10 which is configured to monitor electrical energy storage cell characteristics such as state of charge (SOC), state of health (SOH), state of power (SOP), state of energy (SOE), state of capacity (SOQ), electrical energy storage voltage, state of resistance (SOR) i.e., internal impedance, and optionally temperature of the electrical energy storage cells. The propulsion electrical energy storage system 2 may be a Li-ion electrical energy storage comprising multiple packs with cells electrically connected in series and in parallel.

The vehicle further comprises a computer system 100 as will be described in more detail herein, and a wireless communication device 90 that can transmit and receive data from a remote server 23 or from secondary vehicles.

Although the vehicle in FIG. 1 is depicted as a heavy-duty truck, embodiments of the present disclosure may as well be implemented in other types of vehicles, such as in buses, light-weight trucks, passenger cars, construction equipment, industrial applications, and marine applications including e.g. vessels or ships.

Generally, it is desirable to estimate the range of the electrical vehicle as provided by the presently available energy in the electrical energy storage device 2. Estimating the range is affected by many factors such as topography, speed, traffic conditions, weather, payload and electric power take-off usage (e.g., compactor for refuse trucks, cooling box for distribution trucks, etc.). All these factors should preferably be taken into account to plan routes and to predict energy consumption. Furthermore, several factors are highly dynamic and uncertain, such as traffic congestions and driver behavior.

Traditionally, range prediction is based on average or past driving information such as the energy consumption during the last e.g., 200 km range. However, past information for the ego-vehicle does not accurately reflect the future conditions. The present disclosure addresses improvements with regards to range estimations and path planning.

Figure 2A:
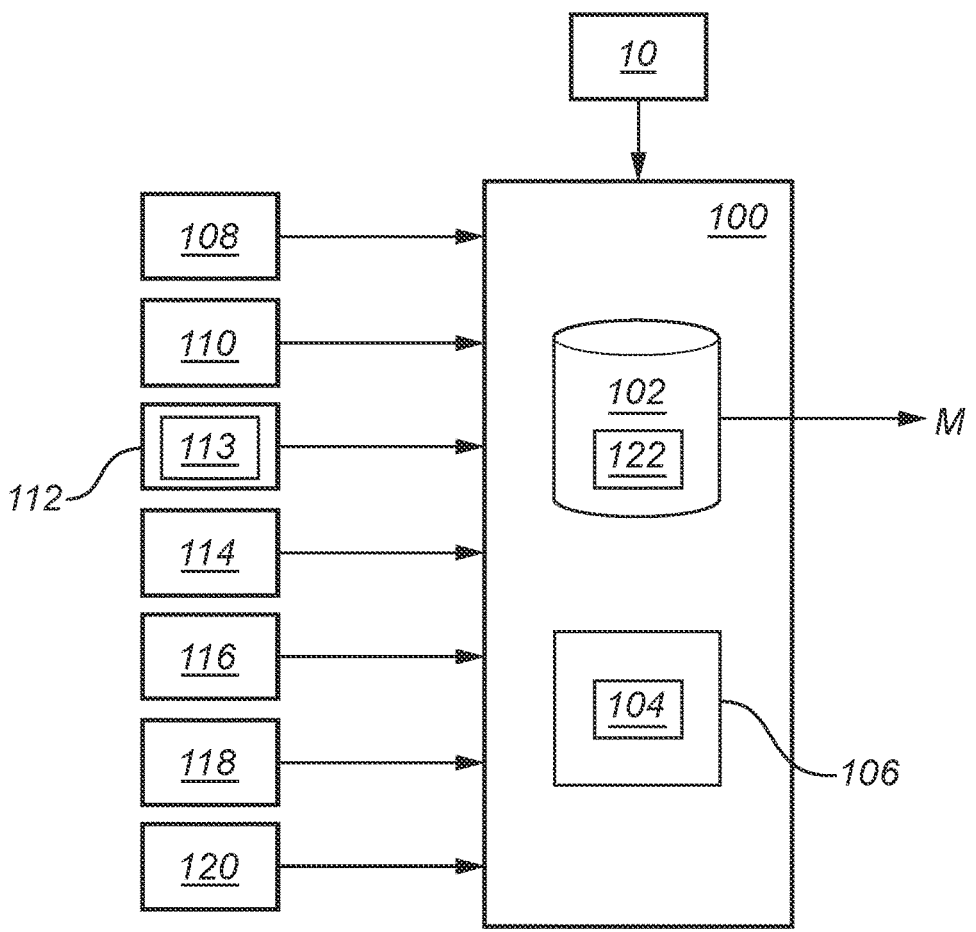
FIG. 2A is a system diagram of a computer system according to an example.

FIG. 2A is an exemplary system diagram of a computer system 100 according to one example. The computer system comprises a processor device 102 operating software components 104 for performing various functions, comparisons, and control operations discussed herein. The software components 104 may be stored in a memory 106 of the computer system 100 accessible to the processor device 102.

The computer system 100 is communicatively connected to a position data device 108 such as a GPS device from which the computer system 100 can receive map data including position data or coordinates for routes and positions in the map. For example, position data for a start position and a destination position of an indicated route may be acquired from the position data device 108, and topography of the indicated route.

The computer system 100 may be communicatively connected to a database 110 or other source of information for charging station locations where the vehicle 2 may stop for charging the electrical energy storage device 2. Charging station locations may equally well be acquired from a GPS 108.

The computer system 100 is configured to receive electrical energy storage data from the management system 10. Electrical energy storage data may include state of charge, SOC, and capacity of the electrical energy storage system 2.

Furthermore, the computer system 100 is communicatively connected to a non-transitory memory device 112 holding a database 113 of reference energy consumption vehicle data from secondary vehicles.

The computer system 100 additionally has access to input such as vehicle information 114 including weight, payload, and electrical energy storage type which may affect estimations of energy consumption, energy model (losses), current weight, auxiliary use such as battery heating/cooling, cabin AC/heater, etc.

In addition, the computer system 100 is connected to traffic services 116 from which the computer system 100 may receive real-time traffic data including average speed for a given route that may indicate congestions which may affect estimations of energy consumption.

Moreover, the computer system 100 may receive information of the indicated route, cargo, desired time-window for the indicated route from a user interface 118.

The processing circuitry 102 maintains a machine learning model 122, or another model or algorithm, that is configured to estimate the energy consumption and variance thereof using the reference energy consumption vehicle data as input data.

The machine learning model or algorithm is configured to predict the energy consumption and the variance thereof.

Such machine learning models or algorithms are preferably probabilistic models or algorithms such as Bayesian networks. Also, neural networks that can predict variances may be applied. That is, not only should the machine learning model or algorithm be able to predict the energy consumption, but it should also be able to predict the variance thereof.

Figure 2B:
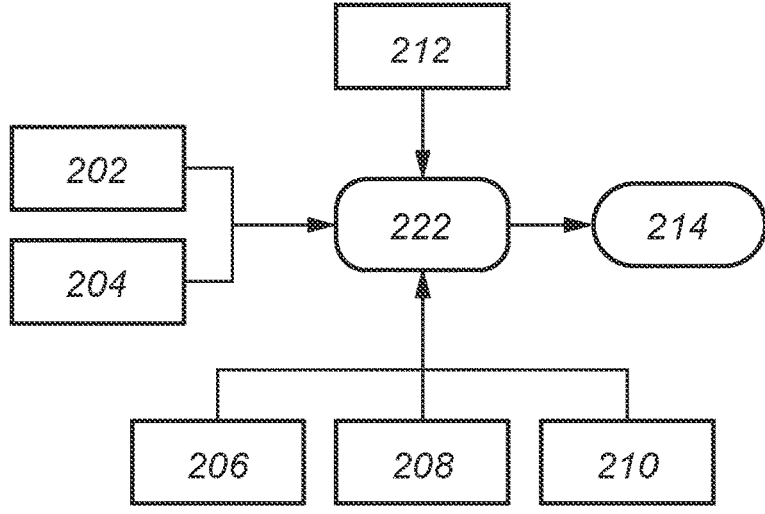
FIG. 2B schematically illustrates an example model-scheme according to an example.

FIG. 2B schematically illustrates an example model-scheme according to an example implementation. The model or algorithm 122 which has been trained on reference energy consumption vehicle data collected from secondary vehicles receives a set of input data. Example input data is cargo delivery data 202 such as weight, destination, and time constraint, real-time traffic data 204, vehicle information data 206, map data 208, charging station data 210, and weather data 212. The model 122 processes the data 202-212 to provide an estimated energy consumption, variance, confidence interval, and e.g., estimate total time of routes, etc.

Figure 3:
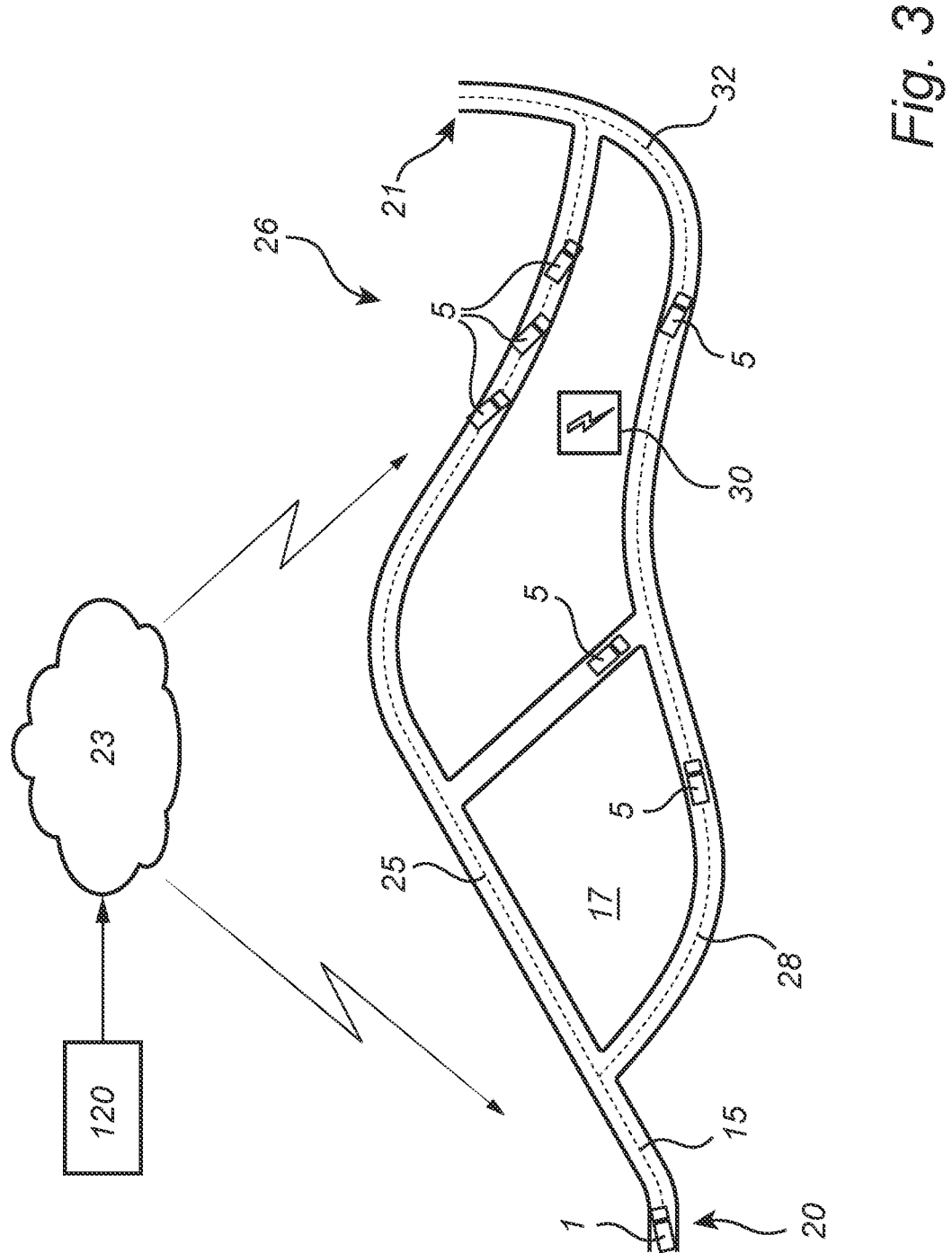
FIG. 3 schematically illustrates a vehicle travelling in an area according to an example.

FIG. 3 schematically illustrates a vehicle 1 travelling on a road 15 in an area 17. The vehicle comprises an electrical energy storage system. The vehicle 1 has an indented route to travel from a start position 20, here being the present position of the vehicle 1, to a destination position 21.

Figure 4:
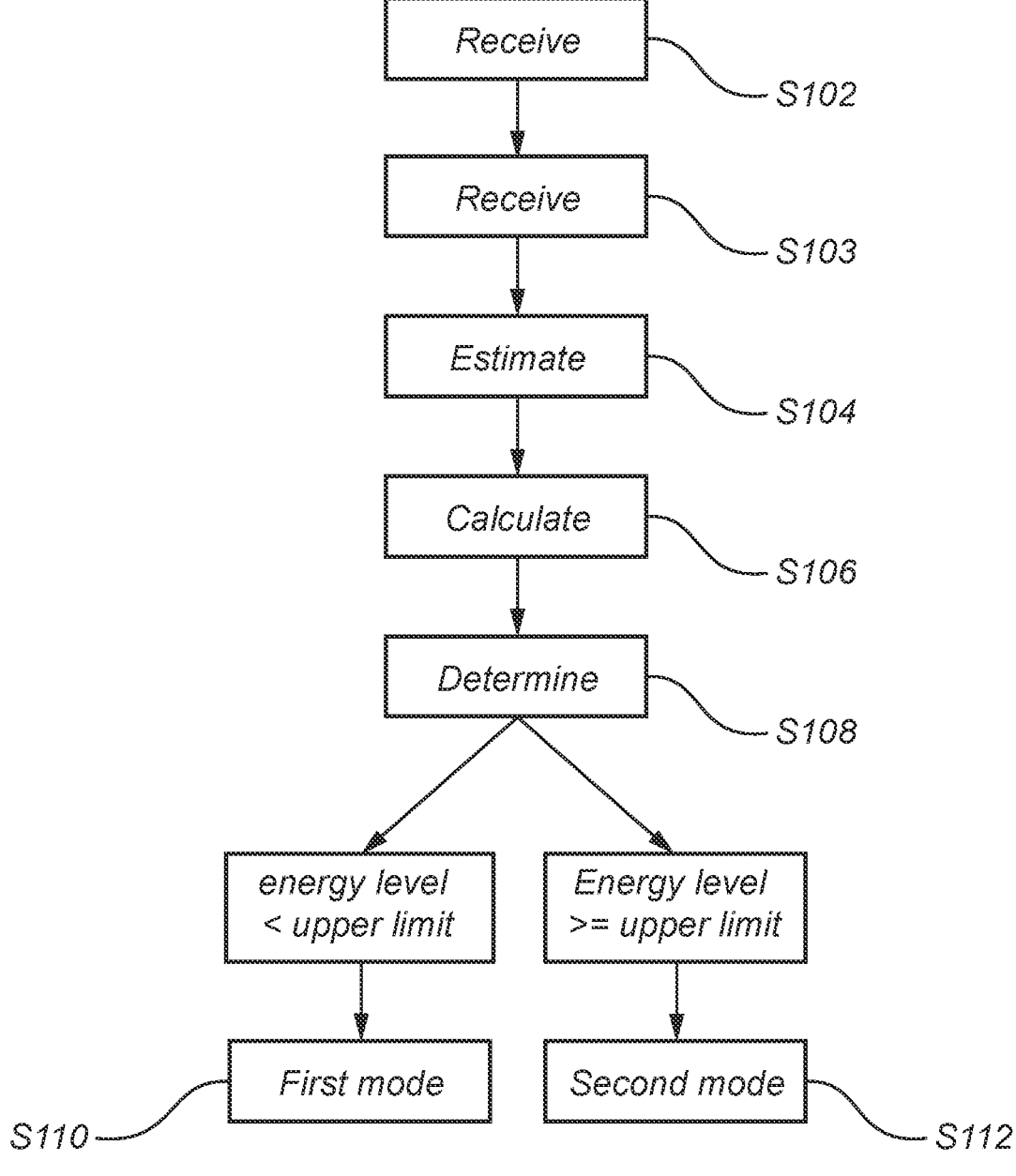
FIG. 4 is a flow-chart of a method according to an example.

FIG. 4 is a flow-chart of method steps according to one example method.

In step S102, receiving, by processing circuitry of a computer system, data indicating a start position 20 and a planned destination position 21 for an electric vehicle of a vehicle type, the vehicle 1 comprising an electrical energy storage system 2. Data of the indicated route including the start position 20 and a planned destination position 21 may be received from a user interface 118.

In step S104, estimating, by the processing circuitry, energy consumption and variance for at least one route between the start position 20 and the destination position 21 for the vehicle type, based on reference energy consumption vehicle data collected from secondary vehicles.

The estimated energy consumption includes added energy from regeneration, braking and downhill drive. The total energy consumption may be the sum of the driveline and the auxiliary's energy use.

The reference energy consumption vehicle data indicates the energy consumption that other vehicles, that is, secondary vehicles, required or used for travelling the route between the start position 20 and the destination position 21, or for travelling parts of the route between the start position 20 and the destination position 21. The reference energy consumption vehicle data may also indicate the vehicle type of the secondary vehicle so that the estimation of energy consumption and variance better matches that of the vehicle type of the present vehicle. The reference vehicle data may optionally include weather conditions, congestion data including average speed, time of day, day of week, etc. The processing circuitry 102 maintains a machine learning model 122, or another model or algorithm, which operates by creating a model behavior that mimics that derived from the reference energy consumption vehicle data. The model may be continuously updated or trained using newly received or measured reference energy consumption vehicle data.

The vehicle may receive reference energy consumption vehicle data from secondary vehicles 5 via a communication network 23 accessible to the vehicles 2, 5, via wireless communication device 90.

A vehicle type may include whether it's a heavy-duty truck, medium size truck, or light truck, a bus, long-range hauler, or car, etc.

Furthermore, the weight of the secondary vehicles optionally includes cargo carried by the vehicle in addition to the weight of the vehicle itself.

The processing circuitry 102 may maintain a database 113 of reference vehicle data for a plurality of secondary vehicles 5 that have travelled at least portions of routes between the start position 20 and the planned destination position 21. The reference data may be continuously collected by the secondary vehicles and the own-vehicle 1, and collected, by the processing circuitry, to update the database 113.

The energy consumption and variance thereof may be estimated for more than one route between the start position 20 and the destination position 21, to determine a first and/or second route as described below.

The variance depends on the reference energy consumption vehicle data. Thus, the variance is not fixed, but will depend on the present situation. Accordingly, the variance is variable and reflects the uncertainty in the estimated energy consumption. For example, it may be relatively reliable to estimate with high accuracy the energy consumption during calm hours with little traffic in rural areas, thereby leading to a relatively smaller variance. In contrast, it may be more difficult to estimate with high accuracy the energy consumption in a busy highway or city setting during rush hours, thereby leading to a relatively larger variance.

In step S106, calculating, by the processing circuitry, a confidence interval for the estimated energy consumption and variance at a predetermined confidence level. The confidence interval may be calculated for at least an intended route 25 but may also be calculated for more routes between the start position 20 and the destination position 21. Since the variance depends on the reference data, the confidence interval will also be variable.

Estimating, in step S104 the energy consumption and variance and calculate the confidence interval in step S106 may be performed by applying, by the processing circuitry, a machine learning algorithm. The machine learning algorithm may be trained on the data in the database 113. In addition, the processing circuitry may train the machine learning algorithm further with the collected data when the database is updated with reference energy consumption data from the secondary vehicles 5.

In step S108, determining, by the processing circuitry, a present energy level in the electrical energy storage system 2.

Figure 5:
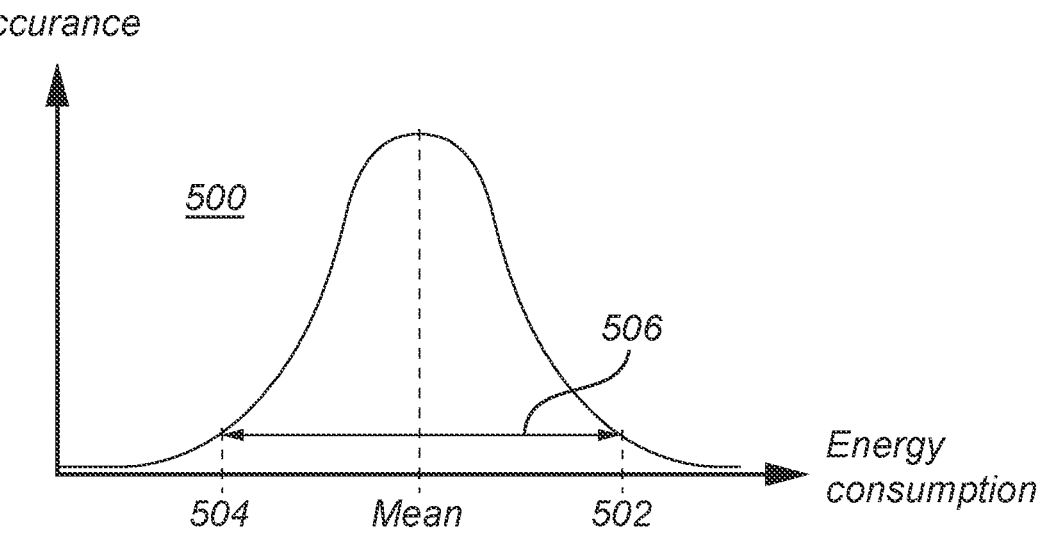
FIG. 5 is an example distribution of reference energy consumption vehicle data according to an example.

The present energy level is compared to the confidence interval. FIG. 5 schematically illustrates a distribution 500 of energy consumption for a route generated based on reference energy consumption vehicle data collected from secondary vehicles.

In FIG. 5, the mean of the distribution, as well as the confidence interval 506 are indicated. The confidence level may vary depending on the implementation, but it can be assumed to be 95% as a preferred example. The confidence level may optionally also be set to 90%, 96%, 97%, 98%, or 99%.

Depending on how the present energy level compares to the confidence interval, different actions may be taken. In this case, to be 95% certain, statistically, that the vehicle can drive the intended route without depleting the SOC of the electrical energy storage system below a preset level, for example 20% SOC, the present energy level, or SOC, must be at least equal to the upper limit 502. If the present energy level is within the confidence level, but below to upper limit 502, the confidence is less than 95%. Thus, the probability that the vehicle will arrive at the destination position with at least the preset level of SOC, is then less than 95%.

Accordingly, in response to the present energy level being below the confidence interval upper limit 502, controlling, by the processing circuitry in step S110, the vehicle 2 according to a first mode, the first mode including a first route 28 between the start position and the destination position. That is, if the energy level is too low to ensure that the present energy level is sufficient to travel the intended route 25, a first route that is an alternative to the route 25, is suggested.

For example, traffic data received from service 116 may indicate a congestion 26 of vehicles that would increase the travel time and also the required energy to travel the route 25. Furthermore, the topography of the route 25 may require more energy than the presently available energy in the electrical energy storage device 2, or the weather conditions may cause higher energy consuming than expected, etc.

Instead, the processing circuitry 102 provides a control message M indicating the first route 28 which may ensure that the vehicle 2 may reach the destination position 21 with a margin energy level, SOC, and confidence, e.g., 95%. In addition, the first route 28 includes a charging event at a charging station 30, as schematically illustrated in FIG. 3. The processing circuitry 102 thereby may suggest a charging stop at the charging station 30 and also the amount of charge needed to complete the trip.

The processing circuitry 102 estimate, the energy consumption and variance for remainder 32 of the first route 28 between the charging station 30 and the destination position 21 for the vehicle type based on reference energy consumption vehicle data for the remainder of the first route collected from secondary vehicles 5. The processing circuitry may calculate a confidence interval for the estimated energy consumption for remainder of the first route and corresponding the variance at a predetermined confidence level. The estimation and calculation are performed analogously with steps S104 and S16.

Furthermore, the processing circuitry 102, may calculated the required minimum charging amount for ensuring an energy level in the electrical energy storage to exceed confidence interval; and controlling, by the processing circuitry, the charging of the electrical energy storage according to the required minimum charging amount. In other words, the processing circuitry 102 calculates the charging time/amount to ensure that the vehicle can reach the destination with the given confidence level. Thus, the amount of charge needed is calculated based on the confidence levels, in order to maximize the chances of completing the trip, but minimizing the time to charge.

In response to the present energy level exceeding or being equal to the confidence interval upper limit 502, controlling, by the processing circuitry in step S112, the vehicle according to a second mode, the second mode including a second route between the start position and the destination position. The second route may be the route 25, thus different from the first route 28.

In some implementations, the vehicle may be operating under time constraints, for example, to deliver cargo at the destination position 21 before a due time. In such situations, the processing circuitry may determine the total time for the first route and for the second route. The total time may be determined further based on calculate speed profiles for the first route and for the second route derived based on traffic information such as speed limits and traffic density, but also based on the vehicle type, weather data, topography of the respective route.

The processing circuitry 102 may determine the first route, and in some cases a second route, so that the destination position 21 is reachable within the time constraint, including charging stops. For example, one possible action could be to just keep driving on the intended route and charge later. Another could be to charge soon to ensure enough charge all the intended route, but with the drawback of increasing total time.

In optional step S103, the processing circuitry receives weather data from a weather service via the communication network 23 that indicates the present weather conditions in the area 17 between the start position and the destination position. The weather data may be input to the algorithm 122 that estimates the energy consumption and variance so that this is also taken into account. The weather data may include temperature and conditions such as rolling resistance, air drag, wind, rain, snow, ice, etc.

In one possible implementation: determining, by the processing circuitry, the total time for the first route and for the second route, receiving, by the processing circuitry, a time constraint, determining, by the processing circuitry, the first route and/or the second route so that the destination position is reachable within the time constraint, maintaining, by the processing circuitry, a database of reference vehicle data for a plurality of secondary vehicles that have travelled between the start position and the planned destination position, collecting, by the processing circuitry, further reference vehicle data to update the database, applying, by the processing circuitry, a machine learning algorithm to the reference vehicle data for estimating the energy consumption and variance and calculate the confidence interval, receiving, by the processing circuitry, weather data indicating the present weather conditions in the area between the start position and the destination position, estimating, by the processing circuitry, the energy consumption and variance for the vehicle further based on the weather data, wherein the first route is different from the second route, and wherein the first route includes a charging event at a charging station.

Figure 6:
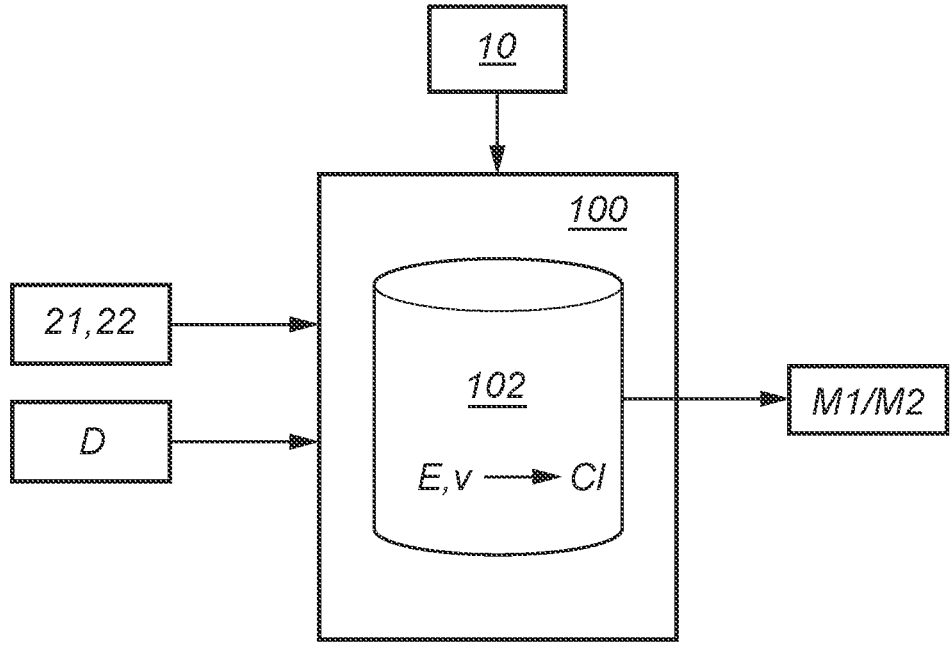
FIG. 6 is another view of FIG. 2, according to an example.

FIG. 6 is another view of FIG. 2, according to an example. A computer system 100 comprising processing circuitry 102 configured to receive a start position 20 and a planned destination position 21 for an electric vehicle of a vehicle type, the vehicle comprising an electrical energy storage system, estimate energy consumption (E) and variance (v) for at least one route between the start position and the destination position for the vehicle type, based on reference energy consumption vehicle data (D) collected from secondary vehicles, calculate a confidence interval CI for the estimated energy consumption and variance at a predetermined confidence level, determine a present energy level in the electrical energy storage system, in response to the present energy level being below the confidence interval upper limit, control the vehicle according to a first mode M1, the first mode including a first route between the start position and the destination position, and in response to the present energy level exceeding or being equal to the confidence interval upper limit, control the vehicle according to a second mode M2, the second mode including a second route between the start position and the destination position.

Figure 7:
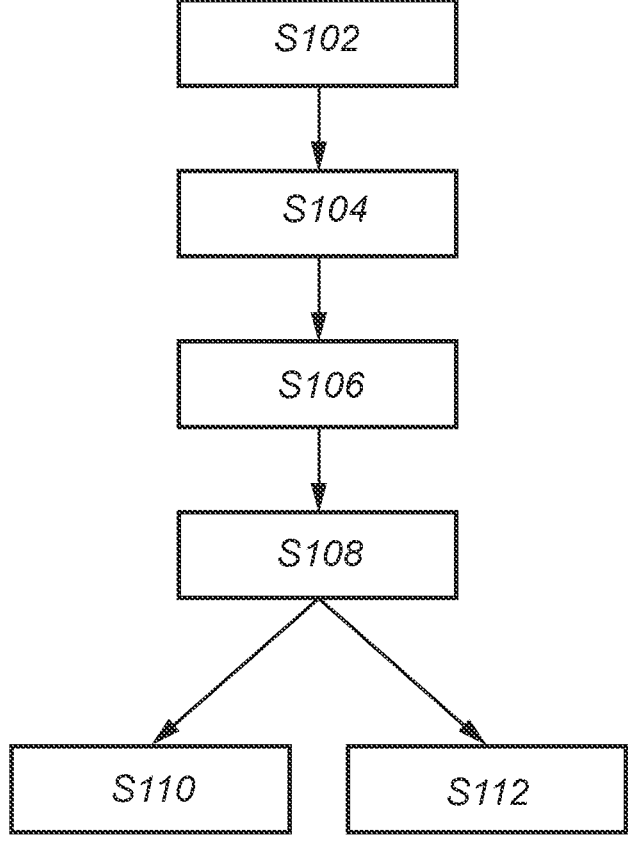
FIG. 7 is a flow chart of a method according to an example.

FIG. 7 is a flow chart of a computer-implemented method according to one example, comprising: receiving S102, by processing circuitry of a computer system, start position and a planned destination position for an electric vehicle of a vehicle type, the vehicle comprising an electrical energy storage system, estimating S104, by the processing circuitry, energy consumption and variance for at least one route between the start position and the destination position for the vehicle type, based on reference energy consumption vehicle data collected from secondary vehicles, calculating S106, by the processing circuitry, a confidence interval for the estimated energy consumption and variance at a predetermined confidence level; determining S108, by the processing circuitry, a present energy level in the electrical energy storage system, in response to the present energy level being below the confidence interval upper limit, controlling S110, by the processing circuitry, the vehicle according to a first mode, the first mode including a first route between the start position and the destination position, and in response to the present energy level exceeding or being equal to the confidence interval upper limit, controlling S112, by the processing circuitry, the vehicle according to a second mode, the second mode including a second route between the start position and the destination position.

Figure 8:
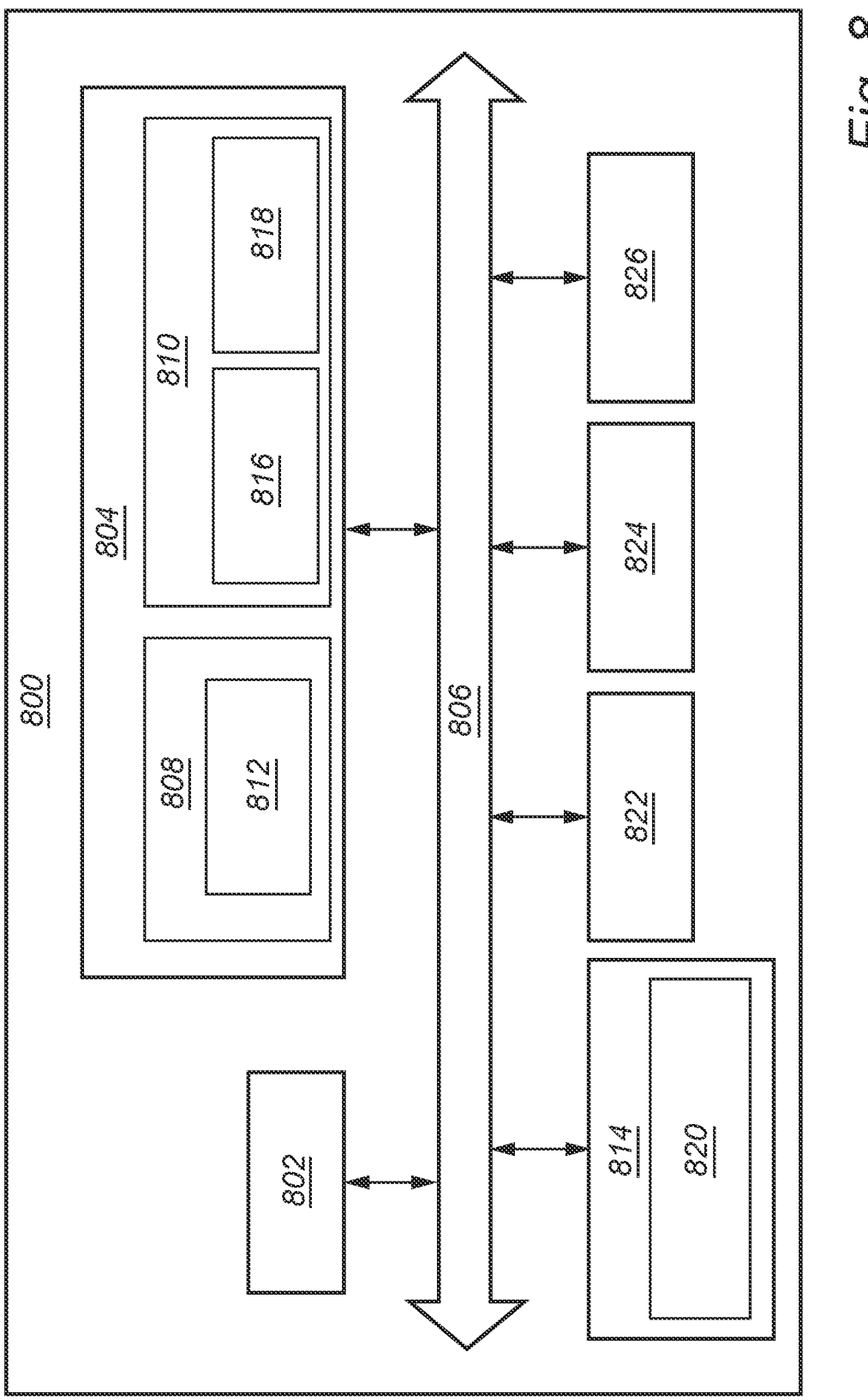
FIG. 8 is a schematic diagram of an exemplary computer system for implementing examples disclosed herein, according to an example.

FIG. 8 is a schematic diagram of a computer system 800 for implementing examples disclosed herein. The computer system 800 is adapted to execute instructions from a computer-readable medium to perform these and/or any of the functions or processing described herein. The computer system 800 may be connected (e.g., networked) to other machines in a LAN, an intranet, an extranet, or the Internet. While only a single device is illustrated, the computer system 800 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 800 may comprise at least one computing device or electronic device capable of including firmware, hardware, and/or executing software instructions to implement the functionality described herein. The computer system 800 may include processing circuitry 802 (e.g., processing circuitry including one or more processor devices or control units), a memory 804, and a system bus 806. The computer system 800 may include at least one computing device having the processing circuitry 802. The system bus 806 provides an interface for system components including, but not limited to, the memory 804 and the processing circuitry 802. The processing circuitry 802 may include any number of hardware components for conducting data or signal processing or for executing computer code stored in memory 804. The processing circuitry 802 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 802 may further include computer executable code that controls operation of the programmable device.

The system bus 806 may be any of several types of bus structures that may further interconnect to a memory bus (with or without a memory controller), a peripheral bus, and/or a local bus using any of a variety of bus architectures. The memory 804 may be one or more devices for storing data and/or computer code for completing or facilitating methods described herein. The memory 804 may include database components, object code components, script components, or other types of information structure for supporting the various activities herein. Any distributed or local memory device may be utilized with the systems and methods of this description. The memory 804 may be communicably connected to the processing circuitry 802 (e.g., via a circuit or any other wired, wireless, or network connection) and may include computer code for executing one or more processes described herein. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)), or any other medium which can be used to carry or store desired program code in the form of machine-executable instructions or data structures and which can be accessed by a computer or other machine with processing circuitry 802. A basic input/output system (BIOS) 812 may be stored in the non-volatile memory 808 and can include the basic routines that help to transfer information between elements within the computer system 800.

The computer system 800 may further include or be coupled to a non-transitory computer-readable storage medium such as the storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 814 and/or in the volatile memory 810, which may include an operating system 816 and/or one or more program modules 818. All or a portion of the examples disclosed herein may be implemented as a computer program 820 stored on a transitory or non-transitory computer-usable or computer-readable storage medium (e.g., single medium or multiple media), such as the storage device 814, which includes complex programming instructions (e.g., complex computer-readable program code) to cause the processing circuitry 802 to carry out actions described herein. Thus, the computer-readable program code of the computer program 820 can comprise software instructions for implementing the functionality of the examples described herein when executed by the processing circuitry 802. In some examples, the storage device 814 may be a computer program product (e.g., readable storage medium) storing the computer program 820 thereon, where at least a portion of a computer program 820 may be loadable (e.g., into a processor) for implementing the functionality of the examples described herein when executed by the processing circuitry 802. The processing circuitry 802 may serve as a controller or control system for the computer system 800 that is to implement the functionality described herein.

The computer system 800 may include an input device interface 822 configured to receive input and selections to be communicated to the computer system 800 when executing instructions, such as from a keyboard, mouse, touch-sensitive surface, etc. Such input devices may be connected to the processing circuitry 802 through the input device interface 822 coupled to the system bus 806 but can be connected through other interfaces, such as a parallel port, an Institute of Electrical and Electronic Engineers (IEEE) 1394 serial port, a Universal Serial Bus (USB) port, an IR interface, and the like. The computer system 800 may include an output device interface 824 configured to forward output, such as to a display, a video display unit (e.g., a liquid crystal display (LCD) or a cathode ray tube (CRT)). The computer system 800 may include a communications interface 826 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: a computer system comprising processing circuitry configured to: receive a start position and a planned destination position for an electric vehicle of a vehicle type, the vehicle comprising an electrical energy storage system, estimate energy consumption and variance for at least one route between the start position and the destination position for the vehicle type, based on reference energy consumption vehicle data collected from secondary vehicles, calculate a confidence interval for the estimated energy consumption and variance at a predetermined confidence level, determine a present energy level in the electrical energy storage system, in response to the present energy level being below the confidence interval upper limit, control the vehicle according to a first mode, the first mode including a first route between the start position and the destination position, and in response to the present energy level exceeding or being equal to the confidence interval upper limit, control the vehicle according to a second mode, the second mode including a second route between the start position and the destination position.

Example 2: the system of example 1, the processing circuitry is further being configured to: determine the total time for the first route and for the second route.

Example 3: the system of examples 1-2, the computer system comprising a memory device that stores the reference vehicle data for a plurality of secondary vehicles that have travelled between the start position and the planned destination position, the processing circuitry being configured to: collect the reference vehicle data, and apply an algorithm for estimating the energy consumption and variance and calculate the confidence interval.

Example 4: the system of examples 1-3, wherein the first route includes a charging event at a charging station.

Example 5: the system of example 4, the processing circuitry may be configured to: estimate energy consumption and variance for remainder of the first route between the charging station and the destination position for the vehicle type, based on reference energy consumption vehicle data for the remainder of the first route collected from secondary vehicles, calculate a confidence interval for the estimated energy consumption for remainder of the first route and corresponding the variance at a predetermined confidence level, calculate the required minimum charging amount for ensuring an energy level in the electrical energy storage to fall within the confidence interval; and control the charging of the electrical energy storage according to the required minimum charging amount.

Example 6, the system of examples 1-5, the processing circuitry is configured to receive weather data indicating the present weather conditions in the area between the start position and the destination position and estimate the energy consumption and variance further based on the weather data.

Example 7: the system of examples 1-6, the processing circuitry is configured to receive a time constraint and determine the first route and/or the second route so that the destination position is reachable within the time constraint.

Example 8: a vehicle comprising the computer system according to any of the examples 1-7.

Example 9: a computer-implemented method comprising receiving, by processing circuitry of a computer system, start position and a planned destination position for an electric vehicle of a vehicle type, the vehicle comprising an electrical energy storage system, estimating, by the processing circuitry, energy consumption and variance for at least one route between the start position and the destination position for the vehicle type, based on reference energy consumption vehicle data collected from secondary vehicles, calculating, by the processing circuitry, a confidence interval for the estimated energy consumption and variance at a predetermined confidence level; determining, by the processing circuitry, a present energy level in the electrical energy storage system; in response to the present energy level being below the confidence interval upper limit, controlling, by the processing circuitry, the vehicle according to a first mode, the first mode including a first route between the start position and the destination position, and in response to the present energy level exceeding or being equal to the confidence interval upper limit, controlling, by the processing circuitry, the vehicle according to a second mode, the second mode including a second route between the start position and the destination position.

Example 10: The method of example 9, further comprising determining, by the processing circuitry, the total time for the first route and for the second route.

Example 11: The method of any of examples 9-10, further comprising: maintaining, by the processing circuitry, a database of reference vehicle data for a plurality of secondary vehicles that have travelled between the start position and the destination position, and collecting, by the processing circuitry, further reference vehicle data to update the database.

Example 12: The method of any of examples 9-11, comprising: applying, by the processing circuitry, a machine learning algorithm for estimating the energy consumption and variance and calculate the confidence interval.

Example 13: The method of examples 11 and 12, further comprising: training, by the processing circuitry, the machine learning algorithm with the collected data when the database is updated.

Example 14: The method of example 7, further comprising: receiving, by the processing circuitry, a time constraint, and determining, by the processing circuitry, the first route and/or the second route so that the destination position is reachable within the time constraint.

Example 15: The method of any of examples 8-14, further comprising: receiving, by the processing circuitry, weather data indicating the present weather conditions in the area between the start position and the destination position, and estimating, by the processing circuitry, the energy consumption and variance range further based on the weather data.

Example 16: The method of any of examples 9-15, wherein the first route includes a charging event at a charging station.

Example 17: The method of example 16, further comprising: estimating, by the processing circuitry, energy consumption and variance for remainder of the first route between the charging station and the destination position for the vehicle type, based on reference energy consumption vehicle data for the remainder of the first route collected from secondary vehicles, calculating, by the processing circuitry, a confidence interval for the estimated energy consumption for remainder of the first route and corresponding the variance at a predetermined confidence level, calculating, by the processing circuitry, the required minimum charging amount for ensuring an energy level in the electrical energy storage to fall within the confidence interval; and controlling, by the processing circuitry, the charging of the electrical energy storage according to the required minimum charging amount.

Example 18: The method of any of examples 9-17, comprising: determining, by the processing circuitry, the total time for the first route and for the second route, receiving, by the processing circuitry, a time constraint, determining, by the processing circuitry, the first route and/or the second route so that the destination position is reachable within the time constraint, maintaining, by the processing circuitry, a database of reference vehicle data for a plurality of secondary vehicles that have travelled between the start position and the planned destination position, collecting, by the processing circuitry, further reference vehicle data to update the database, applying, by the processing circuitry, a machine learning algorithm to the reference vehicle data for estimating the energy consumption and variance and calculate the confidence interval, receiving, by the processing circuitry, weather data indicating the present weather conditions in the area between the start position and the destination position, estimating, by the processing circuitry, the energy consumption and variance for the vehicle further based on the weather data, wherein the first route is different from the second route, and wherein the first route includes a charging event at a charging station.

Example 19: A computer program product comprising program code for performing, when executed by the processing circuitry, the method of any of examples 9-18.

Example 20: A non-transitory computer-readable storage medium comprising instructions, which when executed by the processing circuitry, cause the processing circuitry to perform the method of any of examples 9-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A computer system comprising processing circuitry configured to:

receive a start position and a planned destination position for an electric vehicle of a vehicle type, the vehicle comprising an electrical energy storage system, estimate energy consumption and variance for at least one route between the start position and the destination position for the vehicle type, based on reference energy consumption vehicle data collected from secondary vehicles, calculate a confidence interval for the estimated energy consumption and variance at a predetermined confidence level, determine a present energy level in the electrical energy storage system, in response to the present energy level being below the confidence interval upper limit, control the vehicle according to a first route, the first route including a first route between the start position and the destination position, and in response to the present energy level exceeding or being equal to the confidence interval upper limit, control the vehicle according to a second route, the second route including a second route between the start position and the destination position.

2. The computer system of claim 1, further comprising:

a memory device that stores the reference vehicle data for a plurality of secondary vehicles that have travelled between the start position and the planned destination position, the processing circuitry being configured to:

collect the reference vehicle data, and apply an algorithm for estimating the energy consumption and variance and calculate the confidence interval.

3. The computer system of claim 1, wherein the first route includes a charging event at a charging station.

4. A vehicle comprising the computer system of claim 1.

5. A computer-implemented method, comprising:

receiving, by processing circuitry of a computer system, start position and a planned destination position for an electric vehicle of a vehicle type, the vehicle comprising an electrical energy storage system, estimating, by the processing circuitry, energy consumption and variance for at least one route between the start position and the destination position for the vehicle type, based on reference energy consumption vehicle data collected from secondary vehicles, calculating, by the processing circuitry, a confidence interval for the estimated energy consumption and variance at a predetermined confidence level;

determining, by the processing circuitry, a present energy level in the electrical energy storage system, in response to the present energy level being below the confidence interval upper limit, controlling, by the processing circuitry, the vehicle according to a first route, the first route including a first route between the start position and the destination position, and in response to the present energy level exceeding or being equal to the confidence interval upper limit, controlling, by the processing circuitry, the vehicle according to a second route, the second route including a second route between the start position and the destination position.

6. The method of claim 5, further comprising determining, by the processing circuitry, the total time for the first route and for the second route.

7. The method of claim 5, further comprising:

maintaining, by the processing circuitry, a database of reference vehicle data for a plurality of secondary vehicles that have travelled between the start position and the planned destination position, and collecting, by the processing circuitry, further reference vehicle data to update the database.

8. The method of claim 5, comprising:

applying, by the processing circuitry, a machine learning algorithm for estimating the energy consumption and variance and calculate the confidence interval.

9. The method of claim 5, further comprising:

receiving, by the processing circuitry, a time constraint, and determining, by the processing circuitry, the first route and/or the second route so that the destination position is reachable within the time constraint.

10. The method of claim 5, further comprising:

receiving, by the processing circuitry, weather data indicating the present weather conditions in the area between the start position and the destination position, and estimating, by the processing circuitry, the energy consumption and variance further based on the weather data.

11. The method of claim 5, wherein the first route includes a charging event at a charging station.

12. The method of claim 11, further comprising:

estimating, by the processing circuitry, energy consumption and variance for remainder of the first route between the charging station and the destination position for the vehicle type, based on reference energy consumption vehicle data for the remainder of the first route collected from secondary vehicles, calculating, by the processing circuitry, a confidence interval for the estimated energy consumption for remainder of the first route and corresponding the variance at a predetermined confidence level, calculating, by the processing circuitry, the required minimum charging amount for ensuring an energy level in the electrical energy storage to fall within the confidence interval; and controlling, by the processing circuitry, the charging of the electrical energy storage according to the required minimum charging amount.

13. The method of claim 5, comprising:

determining, by the processing circuitry, the total time for the first route and for the second route, receiving, by the processing circuitry, a time constraint, determining, by the processing circuitry, the first route and/or the second route so that the destination position is reachable within the time constraint, maintaining, by the processing circuitry, a database of reference vehicle data for a plurality of secondary vehicles that have travelled between the start position and the planned destination position, collecting, by the processing circuitry, further reference vehicle data to update the database, applying, by the processing circuitry, a machine learning algorithm to the reference vehicle data for estimating the energy consumption and variance and calculate the confidence interval, receiving, by the processing circuitry, weather data indicating the present weather conditions in the area between the start position and the destination position, estimating, by the processing circuitry, the energy consumption and variance for the vehicle further based on the weather data, wherein the first route is different from the second route, and wherein the first route includes a charging event at a charging station.

14. A non-transitory computer-readable storage medium comprising instructions, which when executed by the processing circuitry, cause the processing circuitry to perform the method of claim 5.

* * * * *